United States Patent [19]
Haddock

[11] Patent Number: 5,983,187
[45] Date of Patent: Nov. 9, 1999

[54] SPEECH DATA STORAGE ORGANIZING SYSTEM USING FORM FIELD INDICATORS

[75] Inventor: Nicholas John Haddock, Bristol, United Kingdom

[73] Assignee: Hewlett-Packard Company, Palo Alto, Calif.

[21] Appl. No.: 08/754,284

[22] Filed: Nov. 20, 1996

[30] Foreign Application Priority Data

Dec. 15, 1995 [GB] United Kingdom .................... 9525719

[51] Int. Cl.⁶ .................................................... G10L 3/00
[52] U.S. Cl. .......................................... 704/275; 704/270
[58] Field of Search ................................... 704/231, 251, 704/270, 275, 276

[56] References Cited

U.S. PATENT DOCUMENTS

| | | | |
|---|---|---|---|
| 5,111,409 | 5/1992 | Gasper et al. | 395/152 |
| 5,386,494 | 1/1995 | White | 395/2.84 |
| 5,526,407 | 6/1996 | Russell et al. | 379/89 |
| 5,577,165 | 11/1996 | Takebayashi et al. | 395/2.84 |
| 5,602,963 | 2/1997 | Bissonnette et al. | 395/2.84 |

FOREIGN PATENT DOCUMENTS

| | | |
|---|---|---|
| 0 679 005 A1 | 10/1995 | European Pat. Off. . |
| 9202009 | 2/1992 | WIPO . |
| 9307562 | 4/1993 | WIPO . |

OTHER PUBLICATIONS

"Capturing, Structuring, and Representing Ubiquitous Audio"; Debby Hindus, et al.; Jul. 1993; pp. 377–400.

"VoiceNotes: A Speech Interface for a Hand–Held Voice Notetaker"; Lisa J. Stifelman, et al.; 8pp.

"Working with Audio: Integrating Personal Tape Recorders and Desktop Computers"; Leo Degen, et al.; May 3–7, 1992; pp. 413–418.

"Method of Categorizing Concatenated Phone Messages into Message Logs" IBM® Technical Disclosure Bulletin; vol. 36, No. 098 Sep. 1993; pp. 297–299.

"Phone Slave: A Graphical Telecommunications Interface"; C. Schmandt and B. Arons; Proceedings of the SID, vol. 26/1, 1985; pp. 789–83.

UIST 95–Proceedings of the ACM Symposium on User Interface Software and Technology—Nov. 14–17, 1995, Pittsburgh (US), pp. 171–179, XP000602486.

Lisa J. Stifelman: "A Tool to Support Speech and Non–Speech Audio Feedback Generation in Audio Interfaces" *p. 171, right–hand column, line 33—p. 172, left–hand column, line 14* p. 174, left–hand column, line 9—line 16*.

Research Disclosure, No. 361, May 1994, Havant GB, p. 234 XP000453941 "Automatic Quick Search System in Dictation Apparatuses".

IBM Technical Disclosure Bulletin, vol. 36, No. 6B, Jun. 1993, New York, US, pp. 169–170, XP000377340 "Categorical Storage of Voice Mail Messages".

IBM Technical Disclosure Bulletin, vol. 36, No. 8, Aug. 1993, New York US, pp. 405–407, XP000390273 "Method for Enhanced Messaging Service".

IBM Technical Disclosure Bulletin, vol. 38, No. 6, Jun. 1995, New York US, p. 635 XP000520801 "Batch Processing of Audio Messages".

IBM Technical Disclosure Bulletin, vol. 37, No. 1, Jan. 1994, New York US, pp. 559–560, XP000428882 Method of an Apparatus for Categorizing Phone Messages.

Primary Examiner—David R. Hudspeth
Assistant Examiner—Michael N. Opsasnick

[57] ABSTRACT

The present invention relates to a system for capturing and storing speech data records comprising:

means for storing parts of a speech data record in a plurality of form fields;

means for the user to input form field indicators;

means for recognizing form field indicators;

wherein the system is operable to store speech data in a speech data record in the form fields according to said indicators.

19 Claims, 2 Drawing Sheets

SPEECH DATA STORAGE ORGANIZING SYSTEM USING FORM FIELD INDICATORS

TECHNICAL FIELD

The present invention relates to devices for storing and accessing speech data.

As computing appliances shrink in size, speech will be an increasingly natural medium for entering and capturing information. The benefits of speech as an input medium are well-known; it is suitable in situations where the user is busy with their hands and eyes, and it is a quick way of capturing information. A growing range of pocket-size products allow the user to capture and store speech data in digital form and to play back voice messages.

However, one disadvantage of information held as recorded speech is that it can be arduous to review later. This invention aims to address that problem.

BACKGROUND ART

Work has been done on organising voice recordings in the form of storage folders on a computer system. Several research projects and products have demonstrated how computer-based, digital voice files can be edited using a graphical editor. Either the whole file, or sections of the file, can be moved or copied into folder areas to aid subsequent retrieval. Documented examples are Hindus, D., Schmandt, C., and Horner, C. 1993, Capturing, Structuring and Representing Ubiquitous Audio in ACM Transactions on Information Systems, 11(4), October, pp. 376–400 and Stifelman, L. J. et al 1993, "VoiceNotes: A speech interface for a hand-held voice notetaker", Proc. InterCHI 1993, ACM, New York.

Applicant's earlier European Patent Application No. 679005 discloses a system in which a visual representation of voice data is displayed and iconic tags are used to automatically store associated parts of speech data in predefined storage areas.

Work has also been done on creating index points in voice recordings. It has been shown how index points can be stamped on voice recordings to aid subsequent retrieval of interesting sections of audio. This is common in consumer electronics products such as hi-fi cassette recorders. The paper by Degen, L., Mander, R., and Salomon, G. 1992, "Working with Audio: Integrating Personal Tape Recorders and Desktop Computers", Proc. CHI 1992, ACM, New York discusses a system where the user can associate index markers with a voice file. A system such as described in IBM Technical Disclosure 36/09B (September 1993) "Method of categorising phone messages into message logs" allows searching within the voice file for a specific keyword or phrase.

There has also been work done on eliciting voice input in a structured, form-based manner. Certain telephone answering services generate voice prompts to structure a caller's voice message (an example is described in the paper by Schmandt, C. and Arons, B., 1985, "Phone Slave: A Graphical Telecommunications Interface", Proc. Soc. Information Display, 26(1)). In effect, the caller is filling in a verbal form in response to questions such as:

"What is your name? (BEEP)"; "What are you calling about? (BEEP)"; etc.

Such services are becoming popular because they simplify the task of listening to message enquiries and routing them to the correct destination within a company.

DISCLOSURE OF INVENTION

According to the present invention we provide a system for capturing and storing speech data records comprising:

means for storing parts of a speech data record in a plurality of form fields;

means for the user to input form field indicators;

means for recognising form field indicators;

wherein the system is operable to store speech data in a speech data record in the form fields according to said indicators.

By providing for form field indicators to be input by the user, the invention enables the indexing of speech data as it is recorded and permits an interaction technique which allows structure and some content to be extracted from a voice record, thus making it easier to review the recording later and to integrate it with other data.

Preferably the system further comprises:

a plurality of storage areas for storing speech data records;

means for inputting storage area indicators;

means for recognising storage area indicators;

wherein the system is operable to store speech data records in the storage areas according to said indicators.

In this way the speech data can be divided into categories convenient for the user eg. phone numbers, to-do items etc., as well as structuring the individual speech records.

In an embodiment to be described, the indicators are keywords spoken by the user and the system comprises memory means for storing a set of key words and means for recognising a key word when spoken.

Optionally, the system may comprise means for detecting a keyword marker in speech data; means for triggering key word recognition on speech data associated with a keyword marker; and means for storing speech data according to the indentity of the associated key word.

A keyword marker may be a pause of predetermined duration in the speech data or may be generated by the user operating a predefined input device, such as a button.

BRIEF DESCRIPTION OF DRAWINGS

Preferred embodiments of the present invention will now be described, by way of example, with reference to the accompanying drawings.

BEST MODE FOR CARRYING OUT THE INVENTION, & INDUSTRIAL APPLICABILITY

Figure 1:
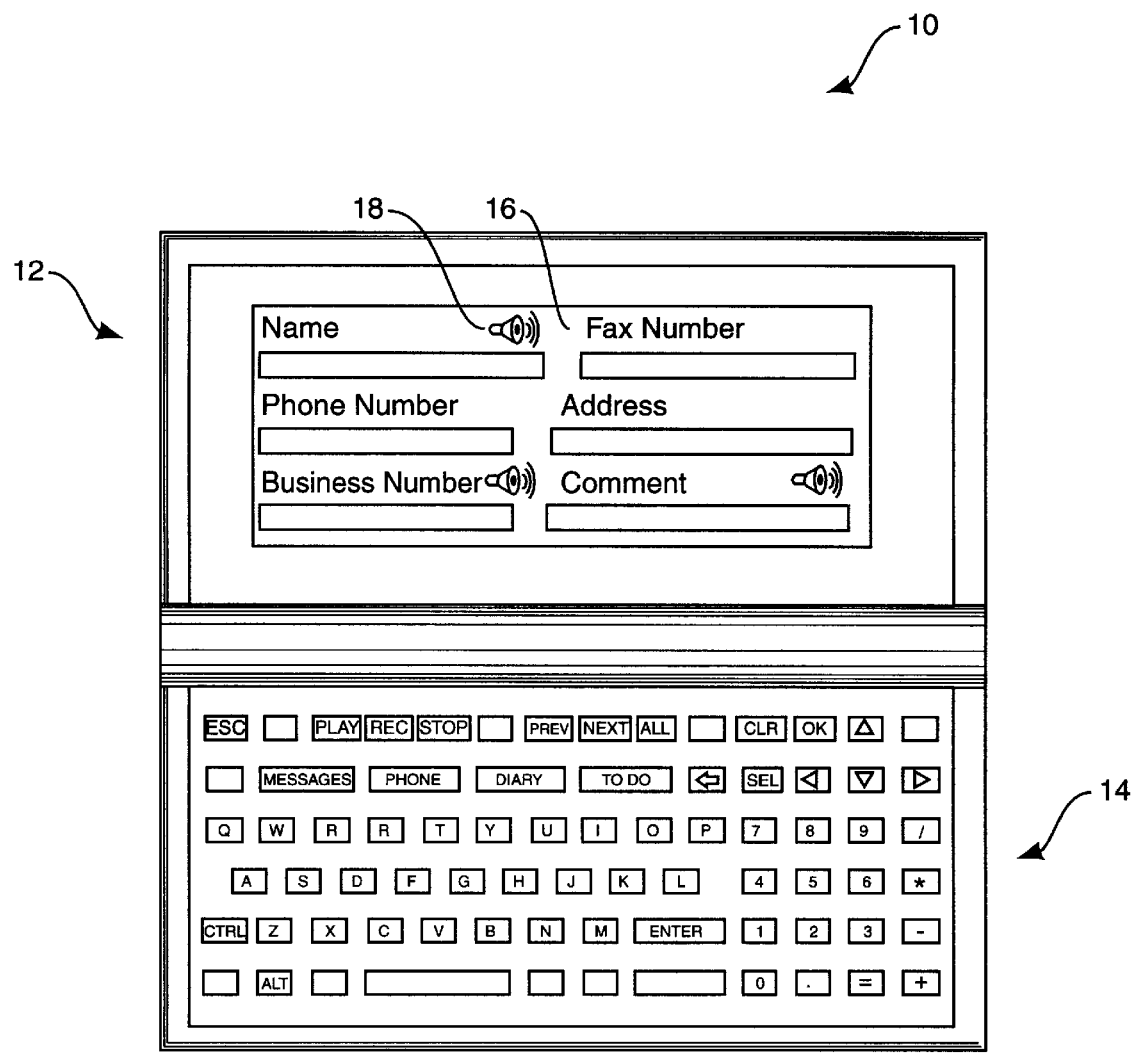
FIG. 1 shows a handheld computer implementing the present invention.

FIG. 1 shows a handheld computer 10 comprising a display screen 12 and a set of keys 14 for user input. The computer contains four data areas, or 'applications': a phone book, diary, to-do list, and messages. Each application is a list of entries, and each entry in the list is a form with several fields. Optionally, text can be entered into each field for display to the user. If the system has automatic word recognition capability, text may be entered automatically by the system.

The screen 12 shows a form-based phone book entry 16. The entry 16 includes six fields: Name; Home Number; Business Number; Fax Number; Address; Comment. An audio icon 18 indicates that a field contains speech. Speech can be played back in clips from its field location, or as the original whole record.

Figure 2:
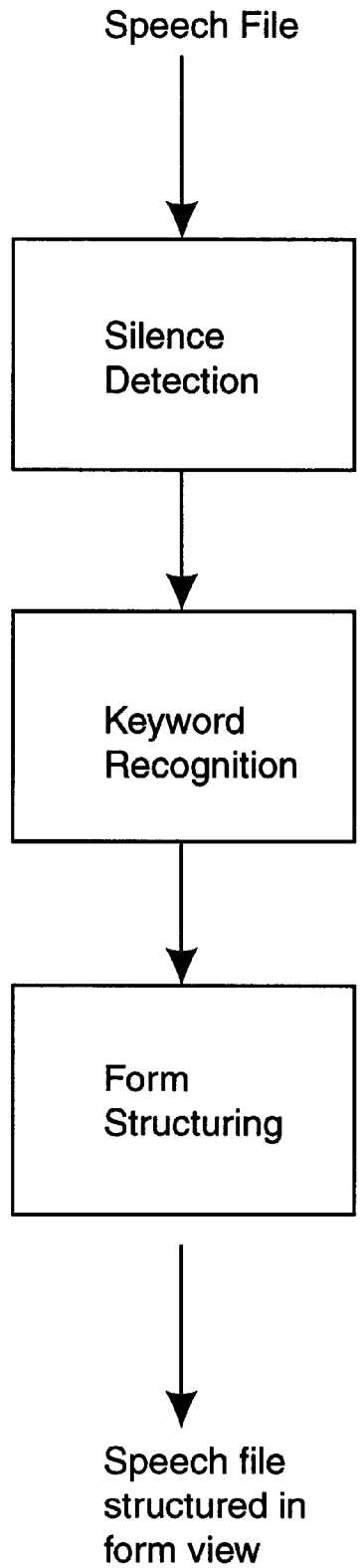
FIG. 2 indicates the main system components required for implementing the present invention.

FIG. 2 shows functional components of the present system. A user's speech is input by speech input device 21, and recorded by speech recording device 22. The resulting speech file 23 is analyzed for pauses in silence detection block 24. Recognition of an adequate silence will trigger efforts at keyword recognition as indicated in block 25. In form structuring block 26, the speech data is structured by storing portions of it in a form fields identified by the keyword with which the particular portion of speech is associated. At the end of the recording and structuring process, the result is a speech file structured in form view 27.

New voice recordings are by default added to a 'general' list, which displays simple header information about the items. Further to this, if the voice record begins with the name of a recognised application, such as "Phone book entry", then the voice record is filed into that area; if not, it remains in the general list. If an application name is recognised, then the rest of the voice record is searched for any keyword labels corresponding to form fields. Key word (or phrase) labels are assumed to be preceded by a pause. The speech content following the label, up to the next recognised field name, is then associated with this field in the form.

In order to organise incoming speech data in this way, the system starts by recognising the first section of speech as the name of one of the applications: messages, phone book entry, todo item, or diary entry. This determines which keyword labels (for field names) are then looked for in the remainder of the speech file.

In order to detect keyword labels and build a strcuture from them, three technical components are involved in series, as indicated in FIG. 2:

1. Silence detection
2. Keyword recognition
3. Form structuring

1. Silence detection—once the speech file has been recorded (and placed in the 'general' list), it is scanned for any pauses longer than one second. Silence detection is a standard speech processing technique, and can be implemented in a number of ways. The energy level is measured throughout the voice file, and speech is assumed to be present whenever this level exceeds a threshold. The threshold itself is set in an adaptive manner, depending on the background noise present. The paper by O'Shaughnessy, D. 1987, Speech Communication, New York: Addison-Wesley describes one way of implementing silence detection.

2. Keyword recognition—a standard class of speech recognition technology is used, operating within a small vocabulary (just the field names); the recogniser is for continuous speech, speaker-independent recognition based on sub-word Hidden Markov Models. An available product is by Young, S. J., Woodland, P. C. and Byrne, W. J. HTK: 'Hidden Markov Model Toolkit 1.5', 1993 of Entropic Research Laboratories, Inc. and a published paper is: Young, S. J. and Woodland, P.C. 1993, "The HTK Tied-State Continuous Speech Recogniser" Proc. Eurospeech '93.

The pauses detected at the silence detection stage are the initial anchor points for keyword label recognition. At each anchor point, an attempt is made to match the initial section of subsequent speech against one of the stored keywords or phrases. For example, within the phone book application, after each pause the system is looking for one of:

NAME IS
HOME NUMBER IS
BUSINESS NUMBER IS
FAX NUMBER IS
ADDRESS IS
COMMENT IS

In addition, each keyword/phrase may be followed by 'garbage' phonemes. Garbage is defined as any sequence of phonemes other than the relevant keywords. This is because each keyword label will be followed by material such as "(Name is) Janice Stevens", and the system is not attempting to recognise the name Janice Stevens.

The user may have unintentionally paused during recording, and in these cases the pause will not necessarily be followed by a keyword label. The garbage model also detects the non-keywords which may follow these natural juncture pauses within the speech. Hence at each recognition stage the recogniser is looking for one of the recognised keyword labels, OR garbage.

3. Form structuring—the final component must create the form structure from the segments defined in the silience detection stage, some of which have been labelled with keywords by in the next stage. A segment which begins with a recognised keyword label is associated with the corresponding form field. In addition, all subsequent speech segments, up to (and not including) the next speech segment which starts with a keyword label, are associated (in sequence) with this form field. If a given keyword label occurs at the beginning of more than one segment, then the second occurrence takes precedence, and the former occurrence is ignored.

For example, if while driving along, a user is over-taken by a truck laden with useful looking contact information, they could quickly record the following voice memo using a system according to the invention:

"Phone book entry . . . Business number is 408 927 6353 . . . Name is Hamilton & Co Removals . . . Comment is the truck says something about extra heavy items being a speciality, could get that piano shifted at last".

Given the spoken keywords (underlined), the recorded note will be added as a new entry in an electronic phone book, and the speech will be segmented into three of the different fields in the phonebook form shown on the display in FIG. 1.

The present inventtion provides an interaction technique which allows structure and some content to be extracted from a voice record, thus making it easier to review the recording and integrate it with other data. In particular, it introduces a technique for automatically extracting form structure from a voice recording. This is accomplished by allowing the user to insert indicators (such as keywords) into their speech, as the speech is being recorded, to form index points.

If the recognition capability of the device is sufficiently good, there may be no need for keyword markers (pauses in the above embodiment) at all.

In an alternative embodiment, button presses could be used as keyword markers instead of (or in combination with) silence detection. Here the user would press a button to indicate when a keyword was about to be uttered.

Another alternative to the embodiments described above involves designing the system so that the form field indicators were not necessarily immediately preceding the speech data to which they correspond. For example, the form field indicator could follow the relevant speech data or could be surrounded by it.

I claim:

1. A system for capturing and storing speech data records comprising:

a speech input device;
speech data storage for storing parts of a speech data record in one of a plurality of categories and in a plurality of form fields defined for each said category;
indicator interpreters for recognising category indicators and form field indicators from information provided as a selection by the user at the time of capture of a speech record;

wherein the system is operable to store speech data of a speech data record in the form fields of a particular category according to said category indicators and said form field indicators.

2. A system according to claim 1 wherein the indicators are keywords spoken by the user and the system includes memory for storing a set of key words and a keyword recognizer for recognising a key word when spoken.

3. A system according to claim 2 further comprising:
   a keyword marker detector for detecting a keyword marker in speech data;
   a key word recognition trigger to initiate key word recognition on speech data associated with the keyword marker; and
   a speech data organizer for storing speech data according to the identity of the associated keyword.

4. A system according to claim 3 wherein the keyword marker is a pause of predetermined duration in the speech data.

5. A system according to claim 3 wherein the keyword marker is generated by the user operating a predefined input device.

6. A method for capturing and storing speech data records comprising the steps of:
   providing a speech input device and capturing speech data therewith;
   providing user-selectable speech data storage areas for categories of speech information;
   recording records of distinct speech data blocks in a category, the category being organized into a plurality of predetermined form fields;
   identifying separate portions of a speech data record;
   recognizing form field indicators provided by the user during capture of the speech record indicating which form field a particular portion of a speech data record is to be stored in; and
   storing particular portions of the speech data record into form fields according to the indication provided by the user.

7. The method of claim 6 wherein the indicators are previously established keywords spoken by the user.

8. The method of claim 7 further comprising the steps of:
   detecting keyword markers in speech data;
   recognizing keywords in speech data associated with a keyword marker;
   storing portions of the speech data record in form fields according to the identity of the associated keyword recognized therewith.

9. The method of claim 8 wherein a keyword marker is a pause of predetermined duration in the speech data record.

10. The method of claim 6, further including the steps of:
    recognizing category indicators provided by the user during capture of the speech record indicating which category of speech a distinct speech data block is associated with, and
    storing the portions of the speech data record into the predetermined form fields of the category indicated by the user.

11. The method of claim 10, wherein in the step of storing particular portions of the speech data record into form fields of the indicated category, one or more form fields of the indicated category may be left empty.

12. The system of claim 1, wherein the system is operable such that when a speech data record is stored in the form fields of a particular category, one or more of the form fields of that category may be left empty.

13. A system for capturing and storing speech data records comprising:
    a speech data input device for inputting a speech data record from a user;
    a form field indicator input device for inputting a plurality of form field indicators spoken by the user;
    a form field indication recognizer for recognizing the plurality of form field indicators spoken by the user; and
    a form field distributor for distributing portions of the speech data record to be stored in one or more form fields according to the form field indicators spoken by the user.

14. A system according to claim 13 further comprising:
    a keyword marker detector for detecting a keyword marker in speech data;
    a keyword recognition trigger for triggering key word recognition on speech data associated with the keyword marker; and
    a speech data organizer for storing speech data according to the identity of the associated keyword.

15. A system according to claim 14 wherein the keyword marker is a pause of predetermined duration in the speech data.

16. A system according to claim 14 wherein the keyword marker is generated by the user operating a predefined input device.

17. A system according to claim 13 wherein the form field indicators are determined prior to capturing and storing the speech data record, and the form field indicators are selected by the user.

18. A system according to claim 17 wherein the speech data record is stored in association with one or more of the previously determined form field indicators.

19. A system according to claim 15, further comprising a category indicator input device for inputting a plurality of category indicators spoken by the user, wherein:
    particular categories have a plurality of form fields associated therewith,
    each speech data record is stored in one or more of the form fields associated with a particular category, and
    the user may select one of a plurality of categories in which to store a speech data record by speaking a category indicator associated with a particular category.

* * * * *

UNITED STATES PATENT AND TRADEMARK OFFICE
CERTIFICATE OF CORRECTION

PATENT NO. : 5,983,187
DATED : November 9, 1999
INVENTOR(S) : Haddock

It is certified that error appears in the above-identified patent and that said Letters Patent is hereby corrected as shown below:

Title page, Item [57] ABSTRACT replace the ABSTRACT with the following:

--The present invention relates to a system for capturing and storing speech data records by storing parts of a speech data record in a plurality of form fields, wherein the form field indicators are spoken by the user. The device then recognizes the form fields as spoken by the user, and stores the speech data according to the spoken form fields recognized by the device. The invention enables the indexing of speech data as it is recorded and permits an interaction technique which allows structure and some content to be extracted from a voice record.--

UNITED STATES PATENT AND TRADEMARK OFFICE
CERTIFICATE OF CORRECTION

PATENT NO. : 5,983,187
DATED : November 9, 1999
INVENTOR(S) : Haddock

It is certified that error appears in the above-identified patent and that said Letters Patent is hereby corrected as shown below:

Claim 7 (Column 5, line 42) change "claim 6" to --claim 10--.

Signed and Sealed this

Nineteenth Day of September, 2000

Q. TODD DICKINSON

*Attest:*

*Attesting Officer*            *Director of Patents and Trademarks*